US009020523B2

(12) United States Patent
Moeglein et al.

(10) Patent No.: US 9,020,523 B2
(45) Date of Patent: Apr. 28, 2015

(54) POSITION ESTIMATING FOR A MOBILE DEVICE

(75) Inventors: Mark Leo Moeglein, Ashland, OR (US); Douglas Neal Rowitch, Honolulu, HI (US); Gengsheng Zhang, Cupertino, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 13/225,316

(22) Filed: Sep. 2, 2011

(65) Prior Publication Data
US 2013/0017840 A1    Jan. 17, 2013

Related U.S. Application Data

(60) Provisional application No. 61/506,905, filed on Jul. 12, 2011.

(51) Int. Cl.
H04W 24/00 (2009.01)
G01S 5/02 (2010.01)
G01S 19/25 (2010.01)

(52) U.S. Cl.
CPC ............. *G01S 5/0205* (2013.01); *G01S 19/25* (2013.01)

(58) Field of Classification Search
CPC ....... H04W 4/04; H04W 48/04; H04W 40/20; H04W 4/02
USPC ........................................ 455/456.1; 370/338
See application file for complete search history.

(56) References Cited

U.S. PATENT DOCUMENTS

| 5,594,951 | A | 1/1997 | Bellin |
| 5,604,708 | A | 2/1997 | Helms et al. |
| 5,714,870 | A | 2/1998 | Dunstan |
| 5,848,364 | A | 12/1998 | Ohashi |
| 5,883,594 | A | 3/1999 | Lau |
| 5,947,775 | A | 9/1999 | Yamamoto et al. |
| 5,953,677 | A | 9/1999 | Sato |
| 6,097,958 | A | 8/2000 | Bergen |
| 6,408,196 | B2 | 6/2002 | Sheynblat et al. |
| 6,710,578 | B1 | 3/2004 | Sklovsky |
| 7,057,372 | B2 | 6/2006 | Chen et al. |

(Continued)

FOREIGN PATENT DOCUMENTS

| EP | 2046087 A1 | 4/2009 |
| EP | 2270535 A2 | 1/2011 |

(Continued)

OTHER PUBLICATIONS

International Search Report and Written Opinion—PCT/US2012/044250—ISA/EPO—Nov. 27, 2012.

(Continued)

*Primary Examiner* — Marcos Batista
(74) *Attorney, Agent, or Firm* — Berkeley Law & Technology Group, LLP

(57) ABSTRACT

Disclosed are methods, techniques and/or systems for selecting and/or determining a strategy and/or approach for searching for signals at a mobile device. Characteristics of and/or information obtained from such searched signals may be used in estimating a location of the mobile device. In one particular example, a strategy and/or approach for searching for wireless signals may be based, at least in part, on an availability of resources at a mobile device.

54 Claims, 5 Drawing Sheets

(56) References Cited

U.S. PATENT DOCUMENTS

| | | |
|---|---|---|
| 7,271,765 B2 | 9/2007 | Stilp et al. |
| 7,359,713 B1 | 4/2008 | Tiwari |
| 7,783,302 B2 | 8/2010 | Hupp et al. |
| 7,848,270 B2 | 12/2010 | Hilmersson |
| 7,873,349 B1 | 1/2011 | Smith et al. |
| 7,953,459 B2 | 5/2011 | Kim et al. |
| 8,060,108 B1 | 11/2011 | Rayburn et al. |
| 8,072,379 B2 | 12/2011 | Gopinath |
| 8,195,468 B2 | 6/2012 | Weider et al. |
| 8,214,910 B1 | 7/2012 | Gossweiler, III et al. |
| 8,228,234 B2 | 7/2012 | Fong et al. |
| 8,472,973 B2 | 6/2013 | Lin et al. |
| 8,744,804 B2 | 6/2014 | Messenger et al. |
| 2001/0041960 A1 | 11/2001 | Hashida |
| 2003/0104849 A1 | 6/2003 | Arimitsu |
| 2004/0192330 A1 | 9/2004 | Gaal |
| 2004/0198386 A1 | 10/2004 | Dupray |
| 2005/0037775 A1* | 2/2005 | Moeglein et al. .......... 455/456.1 |
| 2005/0060088 A1 | 3/2005 | Helal et al. |
| 2005/0130677 A1* | 6/2005 | Meunier et al. ............ 455/456.6 |
| 2006/0125644 A1 | 6/2006 | Sharp |
| 2006/0255963 A1 | 11/2006 | Thompson et al. |
| 2007/0037610 A1 | 2/2007 | Logan |
| 2007/0089065 A1 | 4/2007 | Lane et al. |
| 2007/0178913 A1* | 8/2007 | Niemenmaa et al. ...... 455/456.4 |
| 2008/0162034 A1 | 7/2008 | Breen |
| 2009/0143018 A1 | 6/2009 | Anderson et al. |
| 2009/0164115 A1 | 6/2009 | Kosakowski et al. |
| 2009/0164120 A1 | 6/2009 | Boore et al. |
| 2009/0192709 A1 | 7/2009 | Yonker et al. |
| 2009/0213004 A1 | 8/2009 | Rhodes et al. |
| 2009/0216438 A1 | 8/2009 | Shafer |
| 2009/0286549 A1 | 11/2009 | Canon et al. |
| 2010/0069062 A1* | 3/2010 | Horn et al. .................... 455/434 |
| 2010/0087230 A1 | 4/2010 | Peh et al. |
| 2010/0106603 A1 | 4/2010 | Dey et al. |
| 2010/0161831 A1 | 6/2010 | Haas et al. |
| 2010/0197321 A1 | 8/2010 | Kim et al. |
| 2010/0240391 A1 | 9/2010 | Povey |
| 2010/0241496 A1 | 9/2010 | Gupta et al. |
| 2011/0172906 A1 | 7/2011 | Das et al. |
| 2011/0177809 A1 | 7/2011 | Pakzad et al. |
| 2011/0178701 A1 | 7/2011 | Gupta et al. |
| 2011/0239026 A1 | 9/2011 | Kulik |
| 2011/0307891 A1 | 12/2011 | Orr et al. |
| 2012/0064922 A1 | 3/2012 | Podoloff et al. |
| 2012/0100895 A1 | 4/2012 | Priyantha et al. |
| 2012/0130632 A1 | 5/2012 | Bandyopadhyay et al. |
| 2012/0143495 A1 | 6/2012 | Dantu |
| 2012/0157113 A1 | 6/2012 | Brisebois et al. |
| 2012/0176525 A1 | 7/2012 | Garin et al. |
| 2012/0203453 A1 | 8/2012 | Lundquist et al. |
| 2012/0268249 A1 | 10/2012 | Kansal et al. |
| 2013/0158860 A1 | 6/2013 | Gum |
| 2014/0106677 A1 | 4/2014 | Altman |
| 2014/0107919 A1 | 4/2014 | Venkatraman et al. |
| 2014/0129175 A1 | 5/2014 | Poduri et al. |

FOREIGN PATENT DOCUMENTS

| | | |
|---|---|---|
| EP | 2648389 A1 | 10/2013 |
| JP | 9005102 A | 1/1997 |
| WO | WO-2010025467 A1 | 3/2010 |
| WO | WO-2011107652 A1 | 9/2011 |
| WO | WO-2012001215 A1 | 1/2012 |

OTHER PUBLICATIONS

Kong J., et al., "Ubiquitous Interacting Object: A Distributed and Localized Approach to Building Ubiquitous Computing Applications," ACM Transactions on Interactive Intelligent Systems, 2013, pp. 1-25.

* cited by examiner

US 9,020,523 B2

POSITION ESTIMATING FOR A MOBILE DEVICE

This application claims priority under 35 USC §119 to U.S. Provisional Application Ser. No. 61/506,905 filed 12 Jul. 2011, and entitled "Position Estimating for a Mobile Device," which is assigned to the assignee hereof and which is incorporated herein by reference.

BACKGROUND

1. Field

Certain aspects of this disclosure relate to position estimation for mobile devices.

2. Information

A mobile device with a receiver adapted to receive and process wireless signals may have processing capabilities to estimate a position or location of the mobile device based, at least in part, on information obtained from such received wireless signals. For example, such a mobile device may be adapted to estimate its position or determine a "position fix" using one or more known techniques such as processing signals received from transmitters in satellite positioning system (SPS) to determine pseudoranges to such transmitters, estimating ranges to transmitters at known locations by measuring signal strength, just to name a few examples. There may be certain advantages and disadvantages to using particular techniques associated with, for example, accuracy, time to fix and power consumption.

SUMMARY

Figure 1:
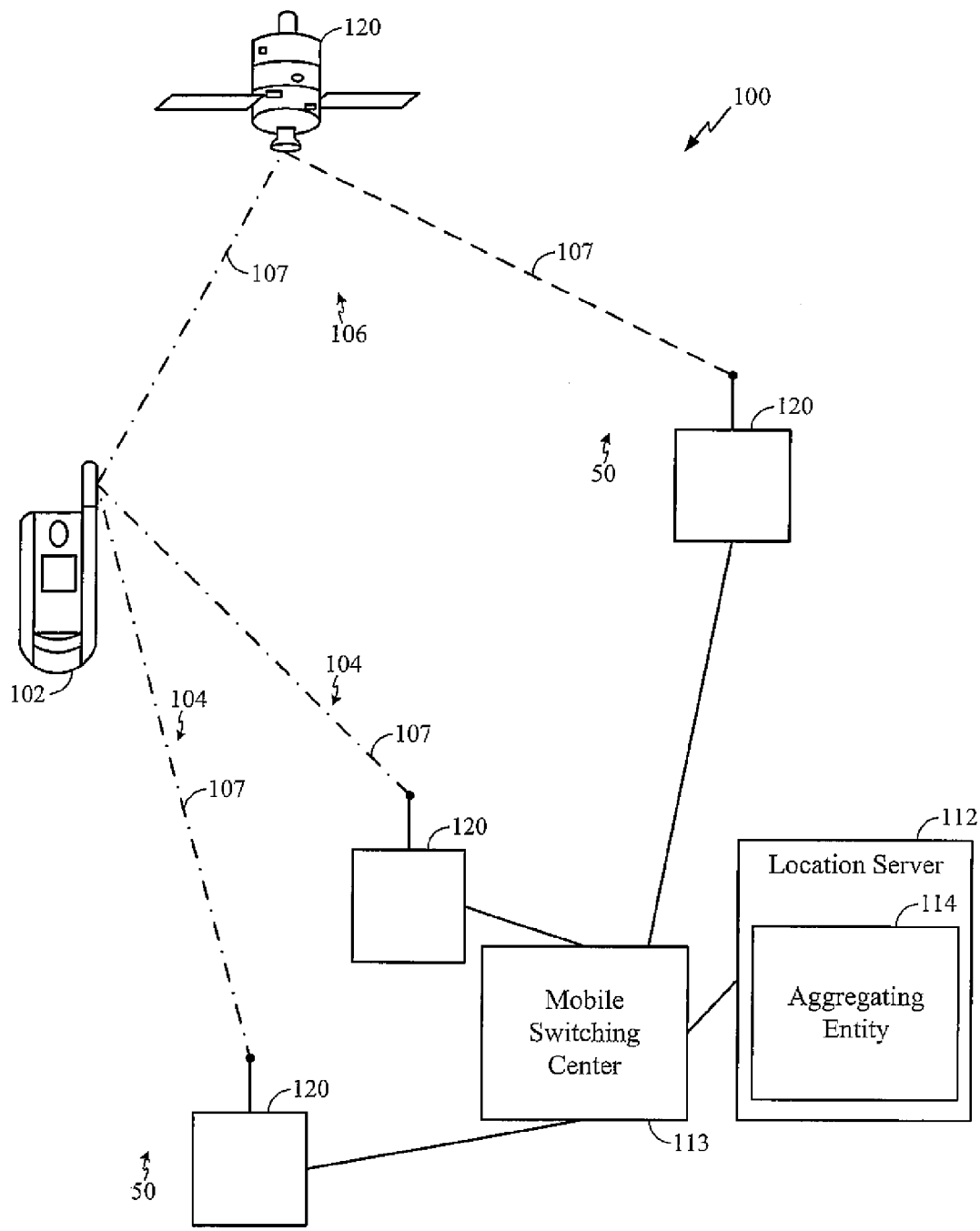
FIG. 1 is a schematic diagram of a hybrid wireless position estimating network with multiple wireless signal interfaces or links, according to one implementation.

One particular implementation is directed to a method performed by a special purpose computing apparatus, the method comprising: storing data representative of one or more probabilistic models in a storage medium; updating the data representative of the one or more probabilistic models based, at least in part, on historical statistical information regarding searching wireless signals; and determining an approach to search for one or more wireless signals transmitted by one or more wireless transmitters for estimating a position of a mobile device based, at least in part, on the updated data representative of the one or more probabilistic models.

Another particular implementation is directed to an article comprising non-transitory storage medium comprising machine-readable instructions stored thereon which are executable by a processor of a special purpose apparatus to: update data representative of one or more probabilistic models stored in a memory based, at least in part, on historical statistical information regarding searching wireless signals; and determine an approach to search for one or more wireless signals transmitted by one or more wireless transmitters for estimating a position of a mobile device based, at least in part, on the updated data representative of the one or more probabilistic models.

Another particular implementation is directed to an apparatus comprising: one or more receivers to receive and process wireless signals; and one or more processors programmed with instructions to: determine an approach to search for one or more wireless signals received at the one or more receivers from one or more wireless transmitters for estimating a position of a mobile device based, at least in part, on one or more probabilistic models, the one or more probabilistic models being updated based, at least in part, on historical statistical information regarding searching the wireless signals.

Another particular implementation is directed to an apparatus comprising: means for maintaining data representative of one or more probabilistic models in a storage medium; means for updating the data representative of the one or more probabilistic models based, at least in part, on historical statistical information regarding searching wireless signals; and means for determining an approach to search for one or more wireless signals transmitted by one or more wireless transmitters for estimating a position of a mobile device based, at least in part, on said updated data representative of said probabilistic models.

It should be understood, however, that these are merely example implementations and that claimed subject matter is not limited in these particular respects.

DETAILED DESCRIPTION

In particular implementations of a mobile device with position estimation capabilities, such a mobile device may estimate its position or location based, at least in part, on information obtained from signals received from transmitters which are positioned at known locations. For example, such a mobile device may estimate its position using anyone of several techniques such as, for example, obtaining pseudoranges to space vehicles (SVs) in a satellite positioning system (SPS), advanced forward link trilateration (AFLT) observed time difference of arrival (OTDOA) (on LTE and/or WCDMA), associating received 802.11 MAC addresses with 802.11 access points at known locations for measuring ranges to the access points based on received signal strength indicator (RSSI) and/or measured round trip time (RTT), just to name a few examples. Likewise, in attempting to obtain an estimate of its location (or "position fix"), such a mobile device may search for and acquire signals transmitted by any one of several particular transmitters to obtain information enabling computation of such a position fix.

In particular implementations, in obtaining information for computing a position fix, a mobile device may select a set of signals to search for from among available signals being transmitted by known transmitters. However, selection of different particular sets of signals to search may provide different outcomes such as, for example, different time-to-fix, different power consumption or different accuracy, just to name a few examples. Accordingly, one aspect of a particular implementation is directed to selection of particular signals to search for obtaining information for use in computing a position fix.

In one aspect of a particular implementation, one or more probabilistic models associated with an ability to acquire signals from particular transmitters may be used for determining an approach for selecting signals to be searched for obtaining information for computing a position fix. In another aspect, such probabilistic models may be updated based, at least in part, on historical statistical information regarding past attempts to search for and/or acquire signals transmitted from the particular transmitters. As described below, using such probabilistic models for selection of signals to search enables tailoring a strategy for searching signals according to particular criteria such as time to fix, power consumption and accuracy in a particular locale. In another aspect, a particular approach chosen or selected may be wirelessly broadcasted for other entities to use in collecting historical statistical information. If a location of a mobile device in question is at an entrance to an indoor building, for example, future attempts to search for SPS signals may not be fruitful, and consume battery power unnecessarily. On the other hand, an existing WiFi access point deployment could be leveraged to provide an alternate means of positioning. Consequently, a historical statistical model of this particular location may suggest to a mobile device to forego attempting to acquire SPS signals in favor of attempting to acquire signals for WiFi-based positioning. Historical statistical information may also suggest particular times (e.g., based on WiFi signal patterns) to re-attempt acquiring SPS signals. Also, these are merely examples of historical statistical information and claimed subject matter is not limited to any exact content of historical statistical information. Historical statistical information may also be expressed in any one of several forms including, for example, parameters associated with a size and type of a particular statistical distribution, an expected value an any particular form such as, for example, an average, mean, median, mode, min, max, range, or any similar form thereof. Historical statistical information may also characterize a shape of a probability distribution such as, for example, Gaussian, exponential, Poisson, Rayleigh, etc., and may indicate parameters specifying or describing such a probability distribution. In other implementations, historical statistical information may include one or more percentile values, confidence intervals, or any information implying a goodness of fit, reliability or availability. In another example implementation, signal strength information may be conveyed in a form of an estimated or specified transmitter power, an EIRP, an antenna pattern, or expected received signal strength at one or more distances from a transmitting antenna. Any of these examples of signal strength information may be referenced to a particular mobile reference implementation, with a particular noise figure or RF sensitivity, for example. A reliability of historical statistical information, or data for use in deriving historical statistical information, may be expressed using a confidence indicator. Such a confidence indicator may be conveyed in terms of probability, for example. Associated accuracy assumptions may be degraded to reflect a low confidence indicator. In the specific example in which statistical information is expressed as a distribution, a number of samples used to infer such a distribution may also be provided as a proxy for reliability information.

Figure 2:
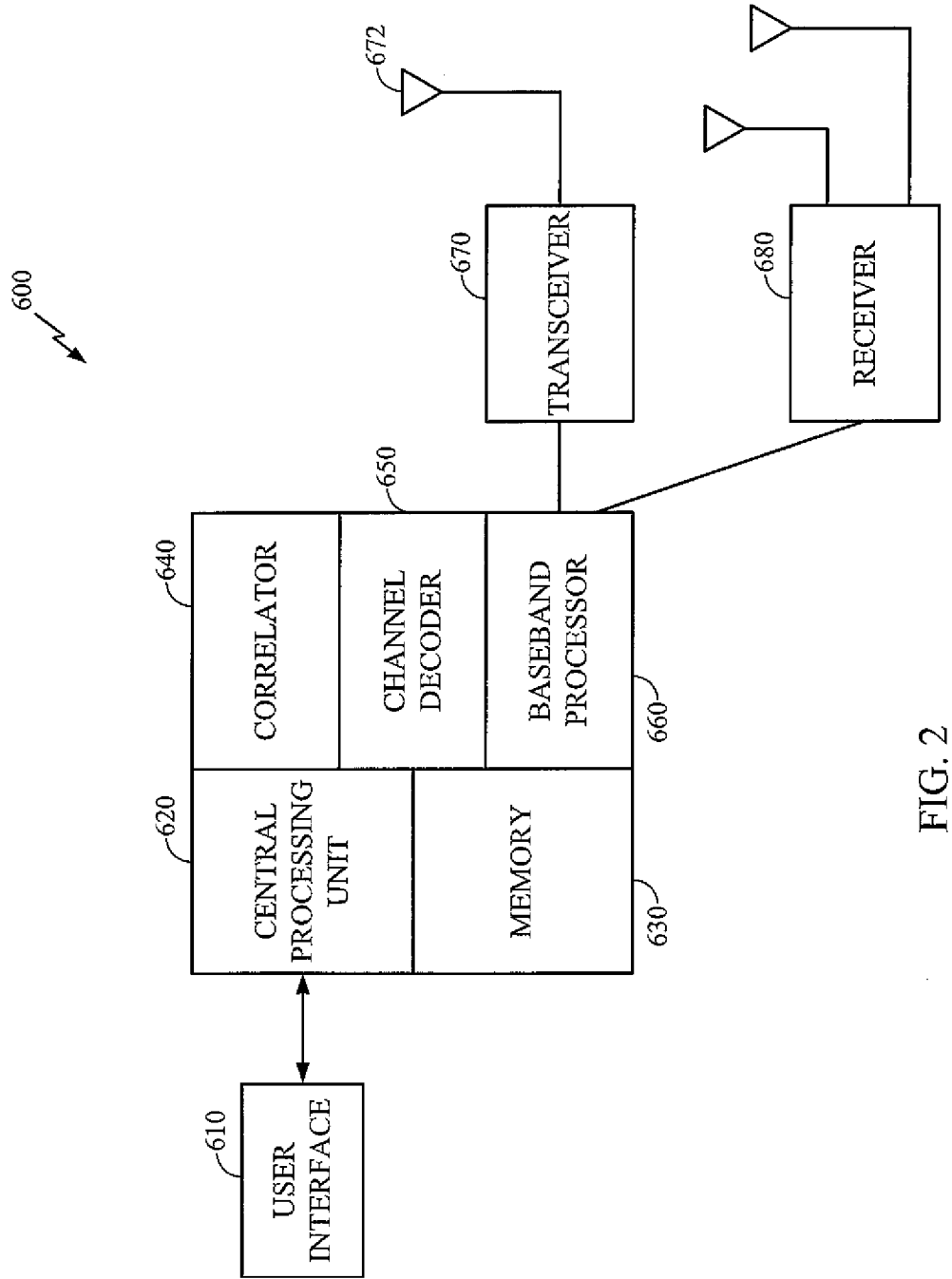
FIG. 2 is a schematic diagram of a mobile device according to one implementation.

In one particular implementation, wireless network 100 in which positions of mobile devices 102 may be estimated at least partially by processing wireless signals 107 transmitted by a wireless transmitter 120, as described with respect to FIGS. 1 and 2. For simplicity, only one mobile device 102 is shown in FIG. 1. It should be understood, however that wireless network 100 may include multiple mobile devices at different geographic locations. Wireless transmitters 120 may transmit wireless signals 107 that are received by a variety of mobile devices 102. In this context, wireless signals 107 may be transmitted in or through wireless signal interfaces or links 104, 106 that extend from wireless transmitter 120 to one or more mobile devices 102. As shown in FIG. 1, a wireless transmitter 120 may be fixed to a spaced-based satellite that is part of a Global Navigation Satellite System travelling in a known orbit. Also as shown in FIG. 1, a wireless transmitter 120 may be fixed to a terrestrial location at an access point such as a cellular base station or wireless LAN access point. Examples of wireless signal interfaces or links 104, 106 can include, but are not limited to, satellite-based links such as satellite positioning system (SPS) wireless links etc., as well as terrestrial wireless communication links such as cellular telephony links, WWAN links, WLAN links, WPAN links, and the like.

A position estimate or fix of a mobile device 102 may be obtained by processing signals received at the mobile device 102 using any one of several techniques. Wireless transmitters 120 which are either terrestrially fixed or satellite-based may be situated at particular known positions. Information relating to the position of wireless transmitters 120 may be known locally at a mobile device 102. In particular implementations, such information relating to positions of wireless transmitters 120 may be stored in a memory locally at a mobile device 102 and/or transmitted to the mobile device 102 from a location server (not shown) over a wireless communication network. By having such knowledge of positions of wireless transmitters 120, measuring a range of a mobile device 102 to wireless transmitters 120 may provide information useful in estimating a position of mobile device 102. However, the usefulness of received wireless signals 107 in estimating a location of mobile device 102 may depend at least in part on characteristics of received wireless signals 107, which may vary based on particular environmental conditions, geographic position and/or location of a mobile device 102 receiving such wireless signals 107. Characteristics of wireless signals 107 affecting such usefulness in estimating a location of mobile device 102 may also vary as a function of time of day, radio frequency (RF) obstructions or interferences, and/or other such factors.

If a mobile device 102 receives multiple wireless signals 107 being transmitted by multiple different wireless transmitters 120, the receiving mobile device 102 may select a particular wireless signal 107 (from a particular wireless transmitter 120) to process based on one or more probability models.

Estimating a position of a mobile device 102 based on received wireless signals 107 may depend on whether the mobile device 102 is within geographic reception areas of wireless transmitters 120 transmitting the received wireless signals 107, and also where the mobile device 102 is positioned within such geographic reception areas. For example, a wireless signal 107 as received at a mobile device 102 may become weaker as a range to an associated wireless transmitter 120 increases. Signal strength of a received wireless signal may not necessarily be closely related to a range to a wireless transmitter transmitting the received wireless signal, however. For example, other factors such as RF obstructions or interferences to wireless signal transmission may diminish strength of a wireless signal at reception.

If a particular wireless signal 107 identifiable as being transmitted by a particular wireless transmitter 120 is received at a mobile device 102, the mobile device 102 may be assumed to be within a particular range of the particular wireless transmitter 120 and positioned within a geographic region. For example, if geographic transmission boundaries corresponding to a transmission range of wireless transmitter 120 are known, then by having a mobile device 102 receive wireless signal from wireless transmitter 120, the mobile device 102 may be ascertained as being within geographic transmission boundaries of wireless transmitter 120.

Different wireless transmitters 120 may transmit wireless signals 107 utilizing different and distinct protocols, information, signal types, etc. Certain wireless signals 107 may be used to provide services to subscribers associated with certain mobile devices 102. While a user of mobile device 102 may subscribe to a particular service to receive the intended contents of certain particular wireless signal transmissions, wireless signal strengths associated with those wireless signal transmissions may be monitored for position estimation without such a subscription. Actually, signal strengths, wireless transmitter identifier, point of origin, and other such details of wireless signals 107 being transmitted by wireless transmitters 120 of different service providers may be monitored in this manner. In a particular implementation, a mobile device 102 may monitor not only wireless signals 107 associated with a particular service provider to which the mobile device 102 is subscribed, but also wireless signals provided by other service providers. Such use of wireless signals 107 transmitted by wireless transmitters 120 from multiple service providers may allow for position estimation using a larger constellation of available wireless transmitters 120.

Certain wireless transmitters 120 may include, but are not limited to: cellular base stations, satellites, pseudolites, WLAN access points, WPAN hubs, network extenders (e.g., repeaters), femto cells, just to name a few examples. As such, a wireless transmitter 120 may comprise a terrestrially-based transmitter or a satellite-based base transmitter such as transmitters on space vehicles (SVs) in a satellite positioning system (SPS) such as any one of several global navigation satellite systems (GNSSs), ground-based pseudolites, transmitters implementing particular broadcast formats (e.g., MediaFLO, ISDB-T, DVB-H, DTV, etc.) (including broadcast-only transmitters), just to name a few examples.

Certain implementations of mobile device 102 may include, but are not limited to: cell phones, satellite phones, satellite radios, PDAs, asset tags and like tracking devices, notebook computers, tablets, portable data hubs, just to name a few examples. Tasks, services, or applications of mobile device 102 may relate to navigation, voice and/or data, using such resources as shared or common processor writing, memory (reading, writing, storing, processing, and other operations), as well as battery power used to search wireless signals. A mobile device may be carried by a person, secured within a vehicle, provided on machinery, just to name a few examples. Certain implementations of mobile device 102 may have limited operational resources. Hence, performing certain tasks or applications may be expected to consume some amount of one or more of these resources.

Particular wireless signals 107 (associated with wireless signal interfaces or links 104, 106) may have distinct operating characteristics, and impart distinct costs, reliabilities and the like associated with enabling position estimating operations associated with a mobile device 102. Characteristics of at least one wireless transmitter 120 may affect dimensions, reliability, and/or other characteristics of a wireless signal interface or link 104, 106 and associated wireless signal 107. A variety of factors may be considered in determining a desirability of processing signals from a particular wireless signal interface or link 104, 106 to select for use in estimating position of a mobile device 102. Such factors may include, but are not limited to: a) how quickly a position estimate may be obtained; b) a likely power consumption or an expected amount of battery power used for searching and/or processing the particular wireless signal; c) availability of alternative wireless signals to process for use in estimating a position; d) expected or likely accuracy of detection or measurement of an expected signal; e) likely accuracy of measurement; f) likelihood of receiving expected signal; g) likely time to fix and/or h) availability of particular resources at the mobile device 102 to process the received signal, just to name a few examples.

In particular implementations, a mobile device 102 may obtain a position estimate or position fix from processing multiple wireless signals 107 transmitted over multiple respective wireless signal interfaces or links 104, 106. Here, a mobile device 102 may search in attempt to detect wireless signal characteristics of and/or information transmitted in one or more of such multiple wireless signals 107. Such signal characteristics of and/or information transmitted in selected wireless signals 107 associated with particular transmitters may be detected or obtained by searching and processing the selected wireless signals 107. Such signal characteristics and/or information may include, for example, signal strength, code phase, round-trip delay, transmitter identification information (e.g., identification of one or more transmitters such as WLAN MAC addresses associated with transmitters at known locations, CDMA pn offsets), transmitter timing information, just to name a few examples. Transmitter timing information may include, for example, one or more error estimates associated with the timing of a signal transmitted by a transmitter, a relationship between a framing structure of a signal transmitted by at least one transmitter and a standardized time source.

In this context, "search" or "searching" a wireless signal 107 transmitted from a wireless transmitter 120 may include any one or a combination of signal processing techniques for use in detecting or measuring particular characteristics of and/or obtaining information transmitted in a received wireless signal 107 (e.g., for the purpose of estimating a position of a receiver). Such signal processing techniques may include, for example, digital sampling and filtering, analog filtering, coherent or incoherent integration, correlation, application of discrete fourier transforms, peak detection and related logic, data channel or packet processing, just to name few examples.

In estimating its position, according to an implementation, a mobile device 102 may select a set of particular wireless signals 107 to search based, at least in part, on one or more probabilistic models. Such probabilistic models may characterize an ability of mobile device 102 to extract information from processing particular wireless signals 107 for use in obtaining a position estimate. For example, such a probabilistic model may provide a probability of obtaining sufficiently accurate and reliable information given one or more conditions. In one particular implementation, such a probabilistic model may provide a probability of reliably detecting, measuring and/or acquiring a wireless signal 107 transmitted by a particular wireless transmitter 120 given certain conditions such as, for example, time of day, an indication of an available battery power, approximate location of mobile device 102 within a coverage area, current RF environment, satellite azimuth and/or elevation angle, just to name a few examples. In other implementations, such a probabilistic model may provide a probability of extracting transmitter identification information (e.g., MAC address), a round trip delay or code phase detection under one or more similar conditions. Of course these are merely examples of how a probabilistic model may characterize an ability of a mobile device to extract characteristics and/or information from searching particular wireless signals according to particular implementations, and claimed subject matter is not limited in this respect.

According to particular implementations, the aforementioned probabilistic models may be used in determining a particular search strategy associated with estimating a position of mobile device 102 based upon characteristics and/or information extracted from received wireless signals 107. For example, and as discussed above, a mobile device 102 may select from among several wireless signals 107, transmitted by associated wireless transmitters 120, to obtain information for use in estimating its position. Here, such a mobile device 102 may select to search a wireless signal 107, from among available wireless signals 107, based, at least in part, on one or more of the above described probabilistic models. For example, mobile device 102 may select a particular wireless signal 107 to search based, at least in part, on a probability that such a search would yield sufficiently accurate and reliable information, given particular conditions at the time the search is to be performed. A time that a search is to be performed, if referenced against probabilistic information regarding how often and when a mobile device was observed to be able to detect a certain transmitter or transmitter type, may be useful. For example, a probabilistic model may account for times when a mobile device is at a "home" location, with its respective transmitters in-view, and when the mobile device is at a "work" location with a different set of transmitters known to be in-view. Another example of such a may be a tendency of a mobile device to be able to acquire signals transmitted by satellites in a particular portion of the sky. If a mobile device dwells for a significant duration in an environment where satellites in a portion of the sky are blocked from view, SPS signals may be easier to acquire in a portion of the sky that typically has a satellite in view. In such a case, it may be useful to model GNSS availability by azimuth and/or elevation angle at a given location. However, this is merely an example of how a mobile device may apply a probabilistic model in selecting a particular wireless signal to search and claimed subject matter is not limited in this respect.

In one implementation, information and/or digital signals representative of probabilistic models may be stored and maintained in a memory (not shown) associated with an aggregating entity 114. Here, such mobile device 102 may access and obtain such stored probabilistic models for use in determining a strategy for searching wireless signals 107 (e.g., selecting a particular set of signals to be searched) for use in estimating a position of mobile device 102. In one particular implementation, stored probabilistic models may be derived and/or updated based, at least in part, on historical statistical information gathered in the course of attempts to search wireless signals 107 transmitted from particular wireless transmitters 120. For example, aggregating entity 114 may obtain such historical statistical information gathered from one or more mobile devices 102 in the course of searching for wireless signals 107 of interest transmitted from the particular wireless transmitters 120. A mobile device 102 may also maintain salient information available from previous processing of such search results to communicate using one of many available wireless communication protocols or to perform a position fix. In an alternative implementation, such a mobile device 102 may gather such historical statistical information from a network server. Here, such historical statistical information may be received at a mobile device 102 in a communication session such as in a wireless communication link or from a wired connection (e.g., at a USB port or Internet connection). In another example, mobile device 102 may receive historical statistical information which is wirelessly broadcasted over a broadcast network. Of course, these are merely examples of how historical statistical information may be obtained for use in determining or updating a probabilistic model, and claimed subject matter is not limited in this respect.

In one implementation, such historical statistical information may indicate a success or failure associated with an attempt to search a wireless signal 107 from a particular wireless transmitter 120, and any other associated conditions. Such "success" in searching a wireless signal may be determined if information is obtained from the searched signal for use in computing a position fix. In one particular example, success or failure in searching for a wireless signal may be based, at least in part, on an absolute or relative signal strength threshold applied in a detection technique, for example. Historical statistical information may also include a duration elapsed to acquire at least one searched wireless signal. Historical statistical information may also include indications of accuracy of received signals gathered from an a priori or a posteriori means. Here, an a priori means may measure and/or determine absolute or relative signal strength, mapped multipath behavior, correlation peak shape and/or quantity or observed rate of measurement outliers. An a posteriori means may measure and/or determine a presence of navigation solution outliers, unit fault for an entire navigation solution or component unit faults for each measurement type of interest. Aggregating entity 114 may then update and/or derive one or more of the aforementioned probabilistic models by processing the gathered historical statistical information using for example, mean, median, variance, Bayesian estimation, parametric filtering (including sign test filters, quartile filters, etc.), histograms, weighting, Hidden Markov modeling and/or other filtering techniques to derive one or more of the aforementioned probabilistic models. These models may be updated by aggregating entity 114 in near real-time, for example. Alternatively, such models may be updated in a batch. In one aspect, a mobile device 102 may, following a failed attempt to acquire a signal transmitted from a transmitter 120, reattempt to acquire the signal. Here, determining a particular approach to search for a wireless signal may comprise determining a time to re-attempt acquiring the wireless signal based, at least in part, on updated historical statistical information.

The particular implementation of FIG. 1 shows that aggregating entity 114 is disposed within a network entity such as location server 112, which may communicate with one or more mobile devices 102 through a wireless network connected to mobile switching center 113, for example. In other implementations, however, such an aggregating entity may reside on a particular mobile device 102 that is tailoring a strategy to search wireless signals for obtaining a position fix for the particular mobile device 102. In other implementations, such an aggregating entity may reside on a first mobile device 102 while a second mobile device 102 communicates with the first mobile device 102 for obtaining access to stored signals representative of probabilistic models. In another example implementation, aggregating entity 114 may be accessible through the Internet via a web service or "cloud" using any one of several Internet protocols. Based, at least in part on such accessed probabilistic models, the second mobile or portable device 102 may then select signals to search as discussed above. Here, the second mobile or portable device 102 may communicate with the first mobile device 102 using any one of several techniques such as, for example, mobile to mobile messaging through mobile switching center 113 or peer-to-peer communication, just to name a couple of examples.

Any one of several applications hosted on a mobile device 102 may use an estimated position, frequency and/or clock state of the mobile device 102. Such a frequency and/or clock state of a mobile device 102 may be based, at least in part, on one or more internal or external temperature readings from sensors, combined with an internally held model for changes in frequency of a local oscillator used for controlling frequency and/or clock state with respect to a measured temperature. In a particular implementation, location server 112 and/or aggregating entity 114 may be operated and/or maintained by a service provider. Certain implementations of location server 112 may be provided with suitable processing power and computational characteristics to derive, maintain, store, and/or update information descriptive of probabilistic models as discussed below.

Upon collection of historical wireless signal statistical information at mobile device 102 or other device, such historical wireless signal statistical information may be transported to other devices or systems to be maintained, stored, aggregated, updated, or otherwise processed for deriving and/or updating probabilistic models. In a particular implementation, location server 112 and/or aggregating entity 114 may receive collected historical wireless signal statistical information, and derive and/or update aforementioned probabilistic models accordingly.

In a particular implementation, geographic or spatial movement (or repositioning) of a mobile device 102 may be referenced relative to a reference. As such, the position of mobile device 102 may be expressed in reference to various coordinate axes. Particular implementations may employ one or more of a variety of techniques in estimating a position of mobile device 102 for use in navigation applications, for example.

According to particular implementations, and as pointed out above, mobile device 102 may select any one of several different search strategies for obtaining information for use in estimating a position of mobile device 102. In the particular example of wireless network 100, a position of mobile device 102 may be estimated based at least in part on: a) a wireless signal 107 transmitted from space vehicles in a global navigation satellite system (GNSS); or alternately b) signals transmitted by wireless transmitters 120 which are terrestrially-based using Advanced Forward Link Trilateration (AFLT)-based wireless signal 107, just to name two examples. While acquisition of SPS-based wireless signals may provide relatively high accuracy (e.g., on the order of ten meters), use of such techniques may consume considerably more power at a mobile device 102 than using AFLT, for example. Here, if an AFLT technique is used to estimate a position of mobile device 102 with sufficient accuracy, such a technique may be selected over processing signals transmitted by space vehicles of a GNSS if less energy is likely to be used, for example. For example, accurate position estimation of mobile device 102 may be provided particularly easily if mobile device 102 is determined to be physically close to a wireless transmitter 120 which is terrestrially-based. Such proximity may be estimated in certain instances using signal strengths, transmitter ID, etc.

In another implementation, different search strategies may include searching for signals transmitted by WLAN access points versus search for GNSS signals. For example, depending on a rough location of a mobile device 102, signals transmitted from a WLAN access point may be searched first, followed by searching for GNSS signals if searching for signals from WLAN access points is not successful. In such a case, success may be defined by estimated accuracy, number of transmitters from which signals are received and acquired, probability of a mobile device having moved based, at least in part, on received signal characteristics, just to name a few success criteria.

In some implementations, GNSS assistance data such as, for example, rough position may be available to a mobile device 102 to enable a quicker position fix. In other implementation environments, such GNSS assistance data may not be available. To obtain a rough position, a mobile device 102 may first determine a rough position using any one of several terrestrial positioning techniques such as AFLT. Here, a mobile device 102 may employ probabilistic models in determining a strategy for searching for base station pilot signals (e.g., CDMA pilot signals) for obtaining pilot signal strength measurements. Such probabilistic models may be further extended for searching for signals transmitted from sources other than cellular base stations such as, for example, signals transmitted from WLAN access points, signals transmitted by broadcast-only transmitters, just to name a few examples. Probabilistic models may incorporate not just a probability of search success, given a particular environment, but also a probability of detecting a signal after a certain amount of time has been elapsed while searching, according to a particular model of diminishing returns, for example. Thus, probabilistic models may be revisited from time to time during a search process based, at least in part, on intermediate search results for determining a search strategy for an on-going search, or to determine when to abandon searching a particular signal transmitted by a particular transmitter. Such a strategy may incorporate probabilistic information for a likelihood that a signal would be detected at a given range of signal strengths or at various times since a last search was performed based, at least in part, on results of prior searches.

As pointed out above, information or signals descriptive of or representing probabilistic models for use in selecting a search strategy may be stored in memories or databases of an aggregating entity (e.g., aggregating entity 114) in a form to allow such information to be retrieved and/or updated. Such probabilistic models may be stored in memory, database, or other like memory device, and indicate probabilities of detecting or acquiring, such as may be used in estimating position with a sufficient degree of reliability and/or accuracy as discussed above.

As pointed out above, certain implementations of a mobile device 102 may use probabilistic models to estimate a probability of successfully searching wireless signals 107 to obtain information for computing a position fix. As such, a mobile device and/or its user may consider tailoring its position estimating wireless signal search strategy based at least partially on one or more probabilistic models, relating to such factors as a desired level of accuracy, timeliness, energy consumption, cost of service, remaining battery energy, user settings, etc.

In one particular implementation, certain probabilistic models, as described above, may model a probability of success of position estimation using particular combinations of wireless signals 107. In particular implementations, such a probabilistic model may condition such probabilities of success based, at least in part, on any one of several factors. For example, such probabilities of success may be based, at least in part, one or more approximate or rough estimate of a location of a mobile device 102 receiving wireless signals in a particular geographic region. In other implementations, such a probability of success may be conditioned on any one of several other factors such as, for example, time of day, day of week, time of year, device sensitivity, expected signal strength, expected signal availability, device temperature and expected signal accuracy, just to name a few examples. In one implementation, a mobile device 102 may search for signals based, at least in part, on more than one coarse location estimates, in turn. For example, such a mobile device 102 may search for signals based, at least in part, on a "home" profile first during a time of day that the mobile device 102 had been historically found to be at "home". If, however, a mobile device 102 is not found to be "home", the mobile device 102 may search for signals using a strategy designed for a historically known "office/work" location. Likewise, a mobile device 102 may start a search at an "office/work" location if a time of day/week indicates the mobile device 102 is more likely to found there. Likewise, other factors or historically known device states may be taken into account. For example, commute times and usage history during each of these time states. A mobile device 102 may run location-based applications more often based, at least in part, on its coarse location, the time of day and/or week, etc. and these usage histories may be used to determine times that the mobile device 102 is more likely to need a background position fix, or the coarse location at which the device most often needs location services.

In certain implementations, location server 112 and/or aggregating entity 114 may maintain almanac data associated with wireless signal interfaces or links 104 and 106. Such almanac data may in one exemplary implementation comprise a database of information descriptive, indicative or representative of estimated positions or locations of wireless transmitters 120 (e.g., by latitude, longitude and height or earth-centered coordinates) and/or coverage areas served by any of the wireless transmitters 120. Such almanac data may further associate such information descriptive of locations of wireless transmitters 120 with identification information (e.g. MAC address or cell tower identifier, etc.). Here, for example, a mobile device 102 may determine known locations of wireless transmitters 120 from such almanac data. In particular implementations, mobile device 102 may compute a position fix based, at least in part, on measured ranges (e.g., pseudoranges) to said to such wireless transmitters 120, in combination with such known locations. In other implementations where, for example, a wireless transmitter 120 has a short range and/or small coverage area, a mobile device 102 may estimate its location by merely associating transmitter identification information (e.g., a MAC address) obtained from a signal received from the wireless transmitter 120 with a location of the wireless transmitter 120 obtained from almanac data. It should be understood, however, that these are merely examples of how almanac data descriptive of locations of transmitters may be used in computing a position fix of a mobile device 102, and claimed subject matter is not limited in this respect.

Probabilistic models maintained in aggregating entity 114 may comprise, for example, Hidden Markov Models Bayesian estimators, parametric filters (e.g., sign test filters, quartile filters, etc.), histograms or weighting, as discussed above, and may be used to model states (such as wireless signal and position estimating states) of wireless transmitters 120, wireless signals 107, wireless service or coverage areas, as well as wireless signal interfaces or links 104, 106. Here, such a probabilistic model may model an ability of a mobile device 102 to obtain information for use in estimating its position using a particular wireless signal interface or link 104, 106.

In a particular implementation, stored signals representing probabilistic models maintained in aggregating entity 114 may be updated and returned to a mobile device 102. Such probabilistic models, in particular implementations, may model probabilistic distributions of wireless signals 107 received at the mobile device 102. Such probabilistic distributions may indicate a probability that particular wireless signals 107 that may be received by the mobile device 102 under certain conditions.

Figure 3:
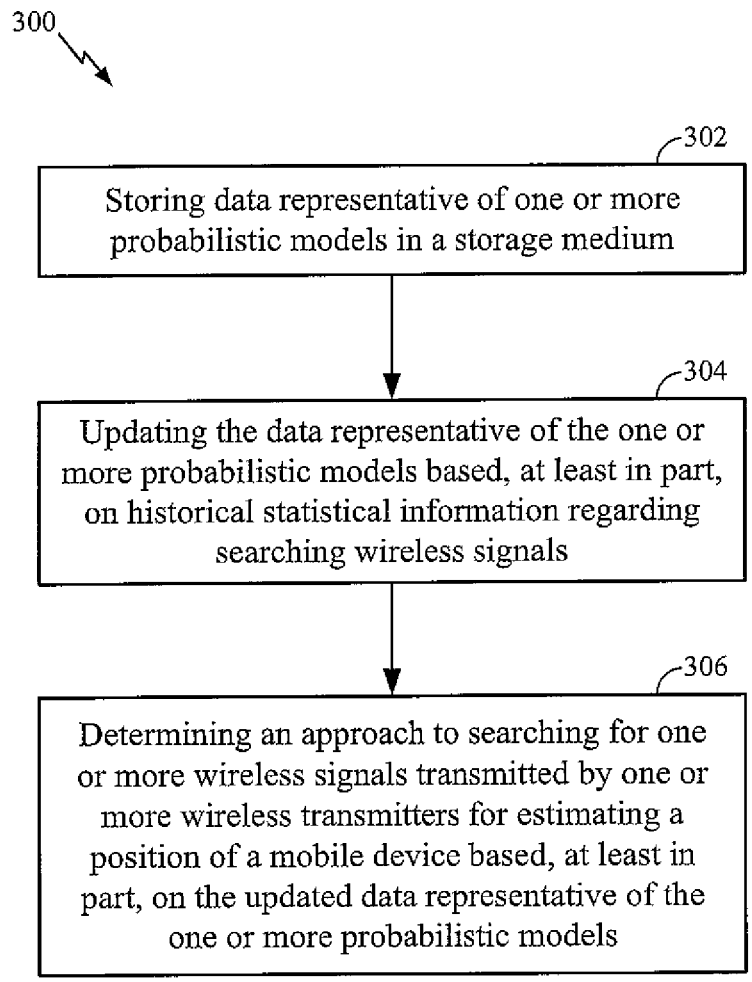
FIG. 3 is a flow chart illustrating an implementation of a process to estimate a position of a mobile device.

FIG. 3 is a flow diagram illustrating one particular implementation of a process to determining an approach for searching for wireless signals based upon one or more probabilistic models. At block 302, information descriptive of one or more probabilistic models is maintained in a memory at one or more entities in a network. In one implementation, such information descriptive of one or more probabilistic models may be represented as signals stored in one or more memory devices. As described above, such probabilistic models may include any one of several conditional probability models such as, for example, a probability of successfully searching a signal transmitted by a particular receiver subject to one or more conditions.

At block 304, one or more probability models maintained at block 302 are updated based, at least in part, on historical statistical information. As discussed above in one particular example, such historical statistical information may comprise an indication of success or failure to search for a wireless signal from a particular transmitter under certain conditions. Accordingly, such historical statistical information may be indicative of search success rates associated with searching signals transmitted by particular wireless transmitters 120. In another alternative aspect, such historical statistical information may be indicative of signal strengths associated with signals transmitted by particular transmitters. Here, for example, such probabilistic models may be affected by measured signal strengths under particular conditions and may model signal strengths under such conditions.

In another alternative aspect, such historical statistical information may be associated with a particular position and/or identifier of a mobile device 102 receiving signals from a particular wireless transmitter 120. Here, associating such historical statistical information with particular mobile devices 102 and locations of same permits updating of probabilistic models (e.g., for determining a probability of successfully searching a signal) as conditioned on a location and/or identity of a receiving device.

In another alternative aspect, historical statistical information may be associated with signals transmitted from a particular transmitter type of a plurality of transmitter types. In one particular example, such historical statistical information may be indicative of successes and failures associated with attempts to search signals transmitted from at least one bi-directional wireless access point. In another particular example, such statistical historical information may be indicative of successes and failures associated with attempts to search signals from a broadcast-only transmitter.

In another alternative aspect, historical statistical information may be indicative of attempts to search signals for use in at least one communication application (e.g., voice or data). In one particular example, such historical statistical information may be indicative of a pilot strength measurement message (PSMM) in a 1×CDMA network. In another particular example, such historical statistical information may be indicative of a network measurement response (NMR) in a GSM network. In another particular example, such historical statistical information may be indicative of an Measured Results List (MRL) associated with a WCDMA or LTE system. Of course these are merely examples of attempts to search signals for use in communication applications according to particular implementations, and claimed subject matter is not limited in this respect. Here, historical statistical information may be mobile device dependent, aggregated over multiple mobile devices 102, or a combination thereof. In this particular implementation, historical statistical information may be maintained on a mobile device 102 or on a separate aggregating network device (e.g., aggregating entity 114).

In another alternative aspect, historical statistical information may include a list of a plurality of wireless signals searched by a particular mobile device 102. Here, for example, such a list may include an indication as to whether individual signals listed (e.g., signals transmitted by particular transmitters) were searched successfully by the particular mobile device 102. Also, such a list may also include information indicating an amount of energy expended or power used to search for the particular searched signals, time required, received signal strength, etc.

In particular implementations, as discussed above, historical statistical information may be provided to an aggregator, such as aggregating entity 114, as part of a bi-directional communication session (e.g., with a particular mobile device searching for signals and providing historical statistical information regarding same). During such a bi-directional communication session, for example, a mobile device may forward historical statistical information associated with or descriptive of multiple transmitters or transmitter types. For example, such information associated with or descriptive of multiple transmitters or transmitter types may be transmitted on a forward link of such a bi-directional communication session. Alternatively, such information associated with or descriptive of multiple transmitters or transmitter types may be transmitted on a reverse link of such a bi-directional communication session.

In a particular implementation, aggregating entity 114 may receive historical statistical information (as discussed above) from a plurality of sources (e.g., multiple mobile devices 102) and update associated probabilistic models based, at least in part on such historical statistical information received from such multiple sources. In a particular example, aggregating entity 114 may receive historical statistical information from multiple mobile devices 102 regarding signals searched from the same particular transmitter. The multiple mobile devices 102 may also have received the received signals while positioned at different locations and under different conditions, etc. Here, aggregating entity 114 may then "aggregate" historical statistical information received from multiple sources to build and/or update one or more probabilistic models associated with that particular transmitter based on multiple searches from different locations and different conditions, etc.

In one particular implementation, aggregating entity 114 may aggregate historical statistical information from multiple sources which is descriptive of timing information associated with particular transmitters. For example, wireless transmitters 120 may transmit signals having characteristics which are synchronized to a particular timing reference. Such timing or calibration information may be used, for example, in computing or correcting ranges or pseudoranges to transmitters. In a particular example, such signals may comprise the phase of a framing structure that is referenced to a particular standard time stamp, or a time stamp associated with a particular framing phase. As such, aggregating entity 114 may also aggregate time information received from multiple sources to associate a detected signal phase with a timing estimate for a particular signal being transmitted by a wireless transmitter 120. Such timing information may also be used, for example, in estimating a phase or frequency of received signals relative to signal timing references for the purpose of narrowing time and/or frequency search windows.

In another particular implementation, aggregated historical statistical information may be associated with and/or comprise an identification of transmitters within a particular operating region. For example, aggregating entity 114 may aggregate and associate historical statistical information with identities of transmitters as indicated in an almanac of transmitters in a particular operating region. In one particular implementation, such an almanac may organize information associated with the transmitters in such an operating region using a hierarchical identification structure. Where such an operating region covers an area serviced by a GSM system, for example, aggregating entity 114 may associate transmitters and/or historical statistical information with a location area code (LAC), and then cell IDs (CIDs) within such an LAC. Similarly, where such an operating region covers an areas serviced by a UMTS system, aggregating entity 114 may associate transmitters and/or historical statistical information with an identifier associated with radio network controllers (RNCs), and then cell IDs associated with such an RNC. In a Long Term Evolution (LTE) and/or other 4G implementation, aggregated historical statistical information may be organized around other, different, hierarchical and non-hierarchical frameworks such as a global cell identifier and/or a subset of a global cell identifier. It should be understood that while a hierarchical organization of historical statistical information may allow for a reduction in redundancy of almanac information in general, claimed subject matter is not limited in this respect.

Based, at least in part on probabilistic models updated at block 304, block 306 may determine one or more approaches for searching signals for the purpose of estimating a location and/or obtaining a position fix. As pointed out above, a mobile device 102 may employ any one of several different approaches to search signals for the purpose of estimating a location and/or obtaining a position fix. As discussed above, a particular approach may be selected based, at least in part, on an updated probabilistic model such as, for example, a probabilistic model of a conditional probability of successfully searching particular signals from particular wireless transmitters 120. As such, a particular approach for searching may comprise selection of at least one signal to be searched by a mobile station.

In a particular example, an approach for searching signals for the purpose of estimating a location and/or obtaining a position fix may indicate a particular transmitter type to be searched. For example, a particular approach may include searching SPS signals transmitted by SVs in a global navigation satellite system. Alternatively, such an approach may include searching signals transmitted by terrestrial base stations as part of an attempt to obtain a position fix using AFLT. A probability of detecting a pilot signal maybe determined, at least in part, from historical AFLT or PSMM information. In addition, such an approach may identify signals from particular transmitters to be searched. For example, if more than four SVs of an SPS are "in view" of a mobile station 102, such an approach may select the four most likely to be acquired for providing a sufficiently accurate position fix based, at least in part, on updated probabilistic information.

In another particular implementation, an approach for searching signals may specify a Doppler window of a particular signal from a particular transmitter and/or transmitter type to be searched. Referring again to the particular example approach of searching one or more SPS signals from SVs, a particular approach determined at block 306 may also specify particular a Doppler window to be employed for searching a signal transmitted by a particular SV. Here, for example, a probabilistic model may indicate a particular probability of successfully searching such a signal conditioned, for example, on Doppler window size. Similarly, in another particular implementation, an approach for searching signals may specify a particular transmitter type and/or specific transmitter to be searched. Referring again to the particular example approach of searching one or more SPS signals from SVs, a particular approach determined at block 306 may specify particular epochs in an SPS signal to be searched. Here, for example, a probabilistic model may indicate a particular probability of successfully searching such a signal conditioned, for example, on particular time windows to search. Such time windows may comprise, for example, fractional parts of a GPS code epoch or fractions of a navigation message epoch for which the navigation message is either well known or has more desirable properties for search sensitivity. Power consumption in connection with conducting a particular search may be conditioned, at least in part, on a size of Doppler and/or time windows.

In another particular implementation, an approach for searching signals may specify a selection of a particular search mode from multiple such search modes. For example, in searching for an SPS signal transmitted by an SV, a particular searching approach may specify a short dwell or a longer dwell for obtaining a code phase detection based, at least in part, on an expected received signal strength or expected received signal attenuation in a particular geographic region. Of course, this is merely one particular example of how a searching approach may involve selection of a search mode from among a plurality of search modes and claimed subject matter is not limited in this respect.

In another particular implementation, an approach for searching signals may be selected subject to particular target accuracy level associated with a position fix to be obtained from searching such signals. For example, such a target accuracy level may rule out particular lower accuracy searching techniques in favor of other searching techniques that provide sufficient accuracy. In another particular implementation, an approach for searching signals may be selected subject to a power consumption constraint. For example, such a power consumption constraint may rule out using particular power-costly searching techniques in favor of other searching techniques that are more power efficient. In yet another particular implementation, an approach for searching signals may be subject to a target time to fix. For example, such a constraint on time to fix may rule out using particular searching techniques likely to yield a longer time to fix in favor of other particular searching techniques likely to yield a shorter time to fix.

In yet another particular implementation, block may 306 may determine scores associated with available candidate approaches for searching signals for obtaining a position fix. Such a score may be determined from a plurality of factors such as, for example, likely power consumption, likely accuracy and/or likely time to fix. Other factors may include, for example, an observed signal strength, a size of coverage area serving a mobile device 102 and/or a type of transmitter transmitting the searched wireless signal (e.g., cellular base station tower, femtocell, IEEE std. 802.11 access point, etc). It should be understood, however, that this is merely an example of factors that may be evaluated for determining a score associated with an available candidate approach for searching signals and claimed subject matter is not limited in this respect.

As pointed out above, any one of several techniques may be selected as an approach or strategy to estimate a position of a mobile device based, at least in part, on wireless signals received at the mobile device 102. In particular implementations, trilateration based upon use of timing information relating to transmissions sent between wireless transmitters 120 and a mobile device 102 may be used to estimate a position of mobile device 102. One approach, called Advanced Forward Link Trilateration (AFLT) as implemented in CDMA or Enhanced Observed Time Difference (EOTD) in GSM or Observed Time Difference of Arrival (OTDOA) on WCDMA and/or LTE, measures at a mobile device 102 relative times of arrival of wireless signals 107 transmitted from wireless transmitters 120. These relative times of arrival of wireless signals 107 transmitted from wireless transmitters 120 may be transmitted to a location server (e.g., a Position Estimation Entity (PDE) in CDMA), which may thereupon estimate a position of mobile device using these times of reception. Alternatively, these measurements may be used to estimate a position of a mobile station 102 at the mobile device 102, if sufficient almanac information is available. Transmit times at a wireless transmitters 120 may be coordinated such that at a particular instance of time, times-of-day associated with multiple wireless transmitters 120 are within a particular error bound. Known positions of wireless transmitters 120 and times of reception may be used to estimate positions of mobile devices. Certain implementations of location server 112 may also monitor emissions from wireless transmitters 120 in an effort to estimate relative timing of these emissions; thereby relative distances as well as resulting position may be estimated at location server 112.

FIG. 2 is a block diagram of an example of mobile station 600 that may be adapted to perform any of the example techniques described. In particular, mobile station 600 may depict a mobile device 102 according to a particular implementation. It should be understood, however, that this is merely an example of a particular mobile device according to a particular implementation and that claimed subject matter is not limited in this respect. One or more radio transceivers 670 may be adapted to modulate an RF carrier signal with baseband information, such as voice or data, onto an RE carrier, and demodulate a modulated RF carrier to obtain such baseband information. An antenna 672 may be adapted to transmit a modulated RF carrier over a wireless communications link and receive a modulated RF carrier over a wireless communications link.

A baseband processor 660 may be adapted to provide baseband information from a central processing unit (CPU) 620 to transceiver 670 for transmission over a wireless communications link. Here, CPU 620 may obtain such baseband information from an input device within a user interface 610. Baseband processor 660 may also be adapted to provide baseband information from transceiver 670 to CPU 620 for transmission through an output device within user interface 610.

User interface 610 may comprise a plurality of devices for inputting or outputting user information such as voice or data. Such devices may include, by way of non-limiting examples, a keyboard, a display screen, a microphone, and a speaker.

A receiver 680 may be adapted to receive and demodulate transmissions from an SPS, and provide demodulated information to correlator 640. In alternative embodiments, receiver 680 may receive and demodulate transmissions according to one or more of the aforementioned broadcast formats in lieu of or in addition to receiving and demodulating SPS signals. Correlator 640 may be adapted to derive correlation functions from the information provided by receiver 680. Correlator 640 may also be adapted to derive pilot-related correlation functions from information relating to pilot signals provided by transceiver 670. This information may be used by a mobile station to acquire wireless communications services. Channel decoder 650 may be adapted to decode channel symbols received from baseband processor 660 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 650 may comprise a turbo decoder.

A memory 630 may be adapted to store machine-readable instructions which are executable to perform one or more of processes, implementations, or examples thereof which are described or suggested herein. CPU 620 may be adapted to access and execute such machine-readable instructions.

Figure 4:
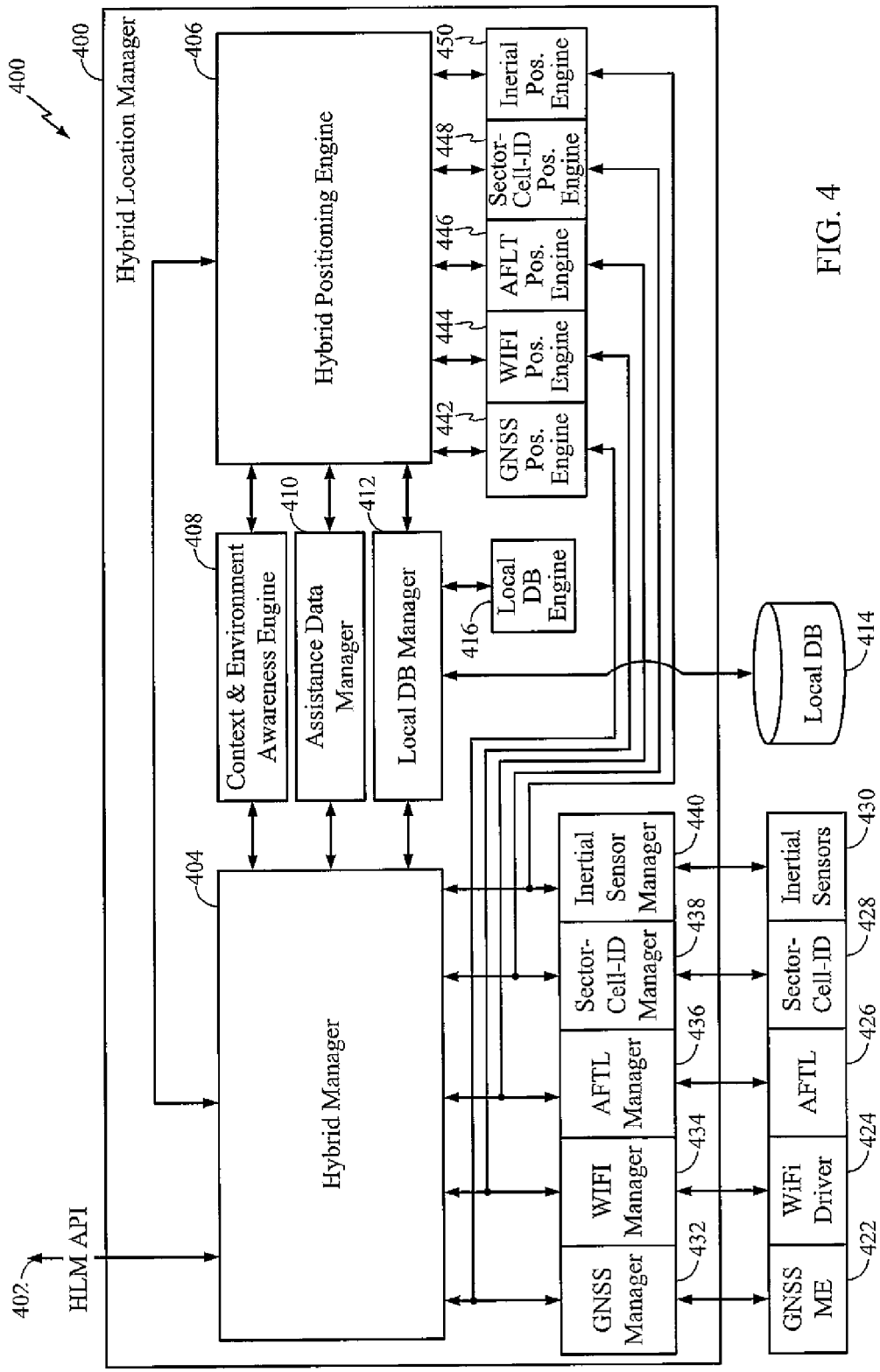
FIG. 4 is a schematic diagram of an implementation of a hybrid location manager and positioning engine in a mobile device.

FIG. 4 is a schematic diagram of a hybrid location manager which may be implemented in a mobile device such as mobile station 600 shown in FIG. 2. In a particular implementation, hybrid location manager 400 may comprise processes that are executed, at least in part, by processing resources residing on a mobile device such as a CPU that executes instructions stored in a memory. As such, components and subcomponents of hybrid location manager 400 may comprise independently developed software modules that are integrated using known real-time programming techniques. In the particular illustrated example, hybrid manager 404 may receive commands from application programming interface (API) 402 requesting location information (e.g., a position fix) to, for example, support one or more particular applications for a mobile device. In an alternative implementation, hybrid manager 404 may be responsive to network initiated requests (e.g., facilitated by Secure User Plane Location (SUPL) based technology) in addition to or in lieu of requests received from API 402. In a particular implementation, such a request from API 402 may specify one or more goals or constraints associated with the requested location information such as, for example, a desired time to fix, accuracy, power/energy consumption, just to name a few examples. In response to a request for location information from API 402, hybrid manager 404 may select one or more techniques and/or methods for obtaining sufficient information for satisfying such a request for location information.

Also, API 402 may specify a particular operational mode for obtaining location information such as, for example, mobile station assisted (MSA), mobile station based (MSB), mobile station assisted and based (MSAB), autonomous, autonomous with extended orbital assistance information, single location fix, periodic location fix, just to name a few examples. In this context, in an MSB operational mode, a position fix for a mobile device 102 may be computed on the mobile device 102. In an MSA operational mode, a position fix for a mobile device 102 may be computed remotely on a server which is separate from the mobile device 102. In an MSAB mode, a position fix for a mobile device 102 may be computed either on the mobile device 102 or remotely on a server which is separate from the mobile device 102. API 402 may also specify other information to be reported by hybrid manager 404 such as, for example, horizontal estimated position error (HEPE), subsystem status, signal measurements, just to name a few examples. API 402 may also supply GNSS assistance data. In a particular implementation, API 402 may be defined independently of any particular over-the-air protocols.

As shown in the particular example of hybrid location manager 400, information used in satisfying a request for location information may be obtained based, at least in part, on measurements from one or more of acquiring GNSS signals through GNSS Measurement Engine (ME) 422, receiving signals from one or more WLAN access points through WiFi driver 424, processing terrestrial wireless signals using WWAN ME 426 and/or Sector-cell-ID circuitry/logic 428, and inertial sensors 430. In a particular implementation, hybrid manager 404 may control activation of subsystems GNSS ME 422, WiFi driver 424, WWAN ME 426, Sector-cell-ID circuitry/logic 428 and/or inertial sensors 430 ('positioning subsystems") to, for example, satisfy a request for location information from API 402 and/or control power consumption of such subsystems. In one example, hybrid manager 404 may configure such subsystems to be in an on, off or auto-select operational state.

In a particular implementation, upon receiving a request for location information from API 402, hybrid manager 404 may evaluate available hybrid positioning options, and choose an appropriate combination of measurement techniques to meet the request. Hybrid manager 404 may make such a choice based, at least in part, on knowledge regarding the capabilities of various positioning subsystems including, for example, achievable position measurement accuracy, achievable RF sensitivity, achievable time-to-fix performance, expected power consumption, any assistance data or database access needed and/or any requirements for calibration prior to autonomous operation, just to name a few examples. Hybrid manager 404 may also make such a choice based, at least in part, on an operational status of various positioning subsystems such as, for example, cold start, warm start or hot start.

In a particular implementation, hybrid manager 404 may choose a particular combination of measurement techniques based, at least in part, context and environmental information received from context and environment awareness engine 408. For example, hybrid manager 404 may activate a particular positioning subsystem while environmental and context conditions are favorable (e.g., for obtaining positioning measurements) for the particular positioning subsystem, and deactivate the particular positioning subsystem while such environmental and context conditions are not favorable. Based upon a chosen hybrid option, hybrid manager 404 may individually command affected positioning subsystems, initiate mode transitions and obtain measurements. Hybrid manager 404 may also perform quality of service checks, report measurements, status, errors and/or other information as requested and as available. Hybrid manager 404 may also request assistance data (e.g., GNSS ephemeris, almanac data, etc.) from assistance data manager 410 for use by various positioning subsystems in processing received signals for obtaining positioning measurements. Assistance data manager 410 may provide assistance data in real-time based, at least in part, on internal operational status, system configuration, location mode and time-to-fix. In a particular implementation, assistance data manager may determine whether assistance data is available internally from other subsystems without obtaining assistance data externally (e.g., using resources of a communication network). An assistance data manager 410 may update local assistance data in local database 414 via local database manager 412 from time to time or as needed. Local database 414 may store assistance data such as, for example, WLAN tiles and base station almanac information.

Hybrid manager 404 may also perform power management to enhance power efficiency. For example, hybrid manager 404 may reduce power consumption by putting a positioning subsystem into a low power mode or lower scanning rate while the particular subsystem is static. Also, hybrid manager 404 may also apply trade-offs between time-to-fix and expected power consumption in choosing a particular combination of positioning subsystems for obtaining measurements for computing a location estimate.

Regarding acquisition of GNSS signals through GNSS ME 422, receiving signals from a WLAN access point through WiFi driver 424, processing terrestrial wireless signals using WWAN ME 426 and/or Sector-cell-ID circuitry/logic 428, such techniques involving searching wireless signals as discussed above. As such, hybrid manager 404 may select particular signals to be searched for obtaining information to satisfy a request from API 402 based, at least in part, on probabilistic models as discussed above. For example, hybrid manager 404 may select signals transmitted from particular transmitters by searching such signals, based, at least in part, on one or more probabilistic models. Hybrid manager 404 may make such selection by issuing commands one or more of GNSS manager 432, WiFi manager 434, WWAN manager 436, sector-cell-ID manager 438 and/or inertial sensor manager 440. The specific example sensors subsystems GNSS ME 422, WiFi driver 424, WWAN ME 426, sector-cell-ID circuitry/logic 428 and/or inertial sensors 430 and subsystems GNSS manager 432, WiFi manager 434, WWAN manager 436, sector-cell-ID manager 438 and inertial sensor manager 440 are provided here merely as examples of particular technologies that may be modeled, managed and/or selected by hybrid location manager 400 for obtaining a position fix. It should be understood, however, that hybrid location manager 400 may be adapted to model, manage and/or select different sensors and related subsystems, including sensors and related subsystems to be developed in the future without deviating from claimed subject matter.

Signals received from GNSS manager 432, WiFi driver 424, WWAN ME 426, sector-cell-ID circuitry/logic 428 and/or inertial sensors 430 may be processed by GNSS manager 432, WiFi manager 434, WWAN manager 436, sector-cell-ID manager 438 and/or inertial sensor manager 440, respectively, and forwarded to GNSS position engine 442, WiFi position engine 444, AFLT position engine 446, sector-cell-ID position engine 448 and inertial position engine 450. Here, GNSS position engine 442, WiFi position engine 444, AFLT position engine 446, sector-cell-ID position engine 448 and inertial position engine 450 may further process signals for use by hybrid position engine 406 to provide location information satisfying a request from API 402. Such location information may comprise, for example, measurements and/or location estimates computed from such measurements. While the particular implementation of FIG. 4 shows a particular implementation in which a position fix may be computed on a mobile device 102 at hybrid positioning engine 406, in other implementations measurements and/or information obtained from GNSS manager 432, WiFi manager 434, WWAN manager 436, sector-cell-ID manager 438 and/or inertial sensor manager 440 may be gathered transmitted over a network to a remote server for computing a position fix without deviating from claimed subject matter.

Hybrid position engine 406 may communicate with GNSS position engine 442, WiFi position engine 444, AFLT position engine 446, sector-cell-ID position engine 448 and inertial position engine 450 for obtaining a navigation solution from measurements obtained from multiple positioning technologies. In particular implementations, hybrid position engine 406 may apply any one of multiple alternative levels of data fusion. In a first level of data fusion, hybrid position engine 406 may select a computed location estimate from among location estimates determined by GNSS position engine 442, WiFi position engine 444, AFLT position engine 446, sector-cell-ID position engine 448 and/or inertial position engine 450. Here, hybrid position engine 406 may select from available location estimates based, at least in part, on a perceived accuracy and/or reliability of such location estimates.

In a second level of data fusion, hybrid position engine 406 may combine available location estimates determined from location estimates determined by GNSS position engine 442, WiFi position engine 444, AFLT position engine 446, sector-cell-ID position engine 448 and/or inertial position engine 450. Here, hybrid position engine 406 may compute a location estimate based, at least in part, on a weighted combination of location estimates, for example. In a third level of data fusion, individual measurements from two or more of GNSS position engine 442, WiFi position engine 444, AFLT position engine 446, sector-cell-ID position engine 448 and/or inertial position engine 450 for the purpose of computing a single location estimate. Here, in this particular implementation, such a third level of data fusion may combine measurements obtained from different position engines to compute a location estimate where measurements from any single position engine may be insufficient and/or incomplete to compute such a location estimate.

By combining measurements and/or location estimates obtained from multiple position engines, hybrid position engine 406 may achieve a higher availability than is possible with only a single position engine. In particular implementations, hybrid position engine 406 may also support MSAB mode, which may simultaneously execute MSA and MSB modes. While in MSAB mode, hybrid position engine 406 may report location estimates and measurements to hybrid manager 404 as they become available. While not shown in FIG. 4, in particular implementations hybrid location manager 400 may communicate with a network interface (not shown) that is capable of transmitting messages to and receiving messages from a remote server through communication network to facilitate MSA and MSAB modes.

In another particular implementation, hybrid position engine 406 may also assist in the calibration of individual positioning subsystems GNSS ME 422, WiFi driver 424, WWAN ME 426, sector-cell-ID circuitry/logic 428 and/or inertial sensors 430 based, at least in part, on measurements obtained from different positioning subsystems. Additionally, hybrid position engine 406 may perform consistency checks between and/or among different positioning subsystems to improve position integrity.

In a particular implementation, context and environment awareness engine 408 may predict and/or recognize a type of environment and/or context for individual positioning subsystems in real-time from, for example, measurements, operation status, database information and/or positions. For example, context and environment awareness engine 408 may maintain probabilistic models based, at least in part, on historical statistical information regarding searching wireless signals as discussed above. As discussed above, such probabilistic models may be updated at an aggregating entity and provided to context and environment awareness engine 408 via a wireless communication network. Alternatively, such probabilistic models may be maintained and updated by context and environment awareness engine 408 from historical statistical information collected at hybrid position engine 406. Here, such probabilistic models may be accessible by hybrid manager 404 in choosing a particular combination of positioning subsystems to use in obtaining positioning measurements to satisfy a request for location information from API 402.

As discussed above, it should be understood that a context and environment of a mobile device can change rapidly. As such, context and environment awareness engine 408 may continuously detect whether a device is static or moving in real-time using measurements from positioning subsystems. As indicated above, hybrid manager 404 may trigger actions in connection with selecting particular subsystems for obtaining positioning measurements based, at least in part, on information obtained from context and environment awareness engine 408.

Figure 5:
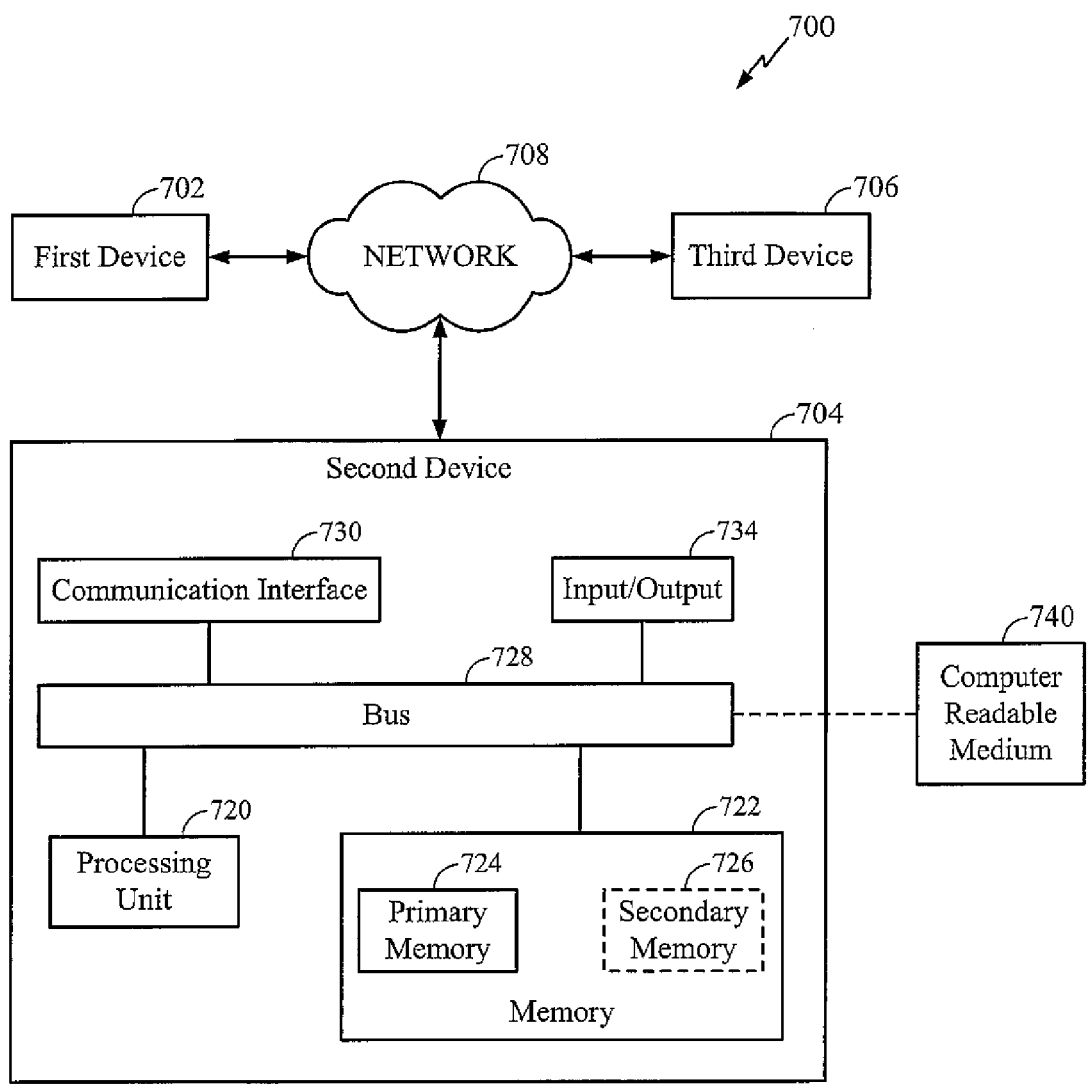
FIG. 5 is a schematic diagram of a computing and communications environment according to a particular implementation.

FIG. 5 is a schematic diagram illustrating an example computing and system 700 that may include one or more devices configurable to implement techniques and/or processes described above, for example, in connection with example techniques depicted in FIGS. 1 and 3. System 700 may include, for example, a first device 702, a second device 704, and a third device 706, which may be operatively coupled together through a network 708.

First device 702, second device 704 and third device 706, as shown in FIG. 4, may be representative of any device, appliance or machine that may be configurable to exchange data over network 708. By way of example but not limitation, any of first device 702, second device 704, or third device 706 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. One or more of first device 702, second device 704, and third device 706 may comprise one or more of a base station almanac database server, a base station, and/or a mobile station in accordance with the examples described herein.

Similarly, network 708, is representative of one or more communication links, processes, and/or resources configurable to support the exchange of data between at least two of first device 702, second device 704, and third device 706. By way of example but not limitation, network 708 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to network 708.

It is recognized that all or part of the various devices and networks shown in system 700, and the processes and methods as further described herein, may be implemented using or otherwise including hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700. Computer-readable medium 740 may also be referred to as a storage medium.

Second device 704 may include, for example, a communication interface 730 that provides for or otherwise supports the operative coupling of second device 704 to at least network 708. By way of example but not limitation, communication interface 730 may include a network interface device or card, a modem, a router, a switch, a transceiver, and the like.

Second device 704 may include, for example, an input/output device 734. Input/output device 734 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 734 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Instructions as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

Storage medium as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device, platform or apparatus. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion throughout, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communication networks such as a wireless wide area network (WWAN), a wireless local area network (WLAN), a wireless personal area network (WPAN), and so on. The terms network and system may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax, time division synchronous CDMA (TD-CDMA), or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (DAMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

Techniques described herein may be used with any one or more of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term satellite, as used herein, is intended to include pseudolites, equivalents of pseudolites, and possibly others. The term SPS signals, as used herein, is intended to include SPS-like signals from pseudolites or equivalents of pseudolites.

While certain exemplary techniques have been described as shown herein using various methods and systems, those skilled in the art that various other modifications may be made, and equivalents may be substituted should understand it. Additionally, many modifications may be made to adapt to a particular situation to teachings of claimed subject matter without departing from central concepts described herein. Therefore, claimed subject matter may not be limited to particular examples disclosed, but that such claimed subject matter may also include all implementations falling within the scope of appended claims, and equivalents thereof.

What is claimed is:

1. A method performed by a mobile device, the method comprising:
   storing data representative of one or more probabilistic models in a storage medium;
   updating said data representative of said one or more probabilistic models based, at least in part, on historical statistical information for wireless signals, at least a portion of said historical statistical information being determined by said mobile device;
   determining, by said mobile device, one or more particular wireless signals for which to search based, at least in part, on said updated data representative of said one or more probabilistic models, said one or more wireless signals to be transmitted by one or more wireless transmitters; and
   searching for said one or more particular wireless signals, by said mobile device, to estimate a position of said mobile device at least partially in response to said determining.

2. The method of claim 1, wherein said historical statistical information comprises information indicative of at least search success rates associated with signals transmitted by at least one transmitter.

3. The method of claim 1, wherein said historical statistical information comprises information indicative of signal strengths associated with signals transmitted by at least one transmitter.

4. The method of claim 1, wherein the historical statistical information is associated with at least one position and identifier associated with said mobile device.

5. The method of claim 1, wherein the historical statistical information includes a list of a plurality of wireless signals searched by said mobile device.

6. The method of claim 5, wherein the list comprises an indication as to whether individual ones of said wireless signals were searched successfully by said mobile device.

7. The method of claim 1, wherein the historical statistical information includes an indication of power used to search said wireless signals.

8. The method of claim 1, wherein the historical statistical information includes a duration elapsed to acquire at least one searched wireless signal.

9. The method of claim 1, wherein said historical statistical information is provided to an aggregator as part of a bi-directional communication session.

10. The method of claim 9, wherein said bi-directional communication session includes transmission of information descriptive of a plurality of transmitter types.

11. The method of claim 10, wherein said information descriptive of said plurality of transmitter types is transmitted on a forward link in said bi-directional communication session.

12. The method of claim 10, wherein said information descriptive of said plurality of transmitter types is transmitted on a reverse link in said bi-directional communication session.

13. The method of claim 1, wherein said historical statistical information is received via a communication session, the method further comprising wirelessly broadcasting one or more signals representative of said approach over a broadcast network.

14. The method of claim 1, wherein said approach comprises a selection of at least one signal to be searched by a mobile station.

15. The method of claim 1, wherein said approach comprises an identification of a particular transmitter type and/or specific transmitter to be searched.

16. The method of claim 15, wherein said approach further comprises specification of a Doppler window of said particular transmitter type and/or specific transmitter to be searched.

17. The method of claim 15, wherein said approach further comprises specification of a time window of said particular transmitter type and/or specific transmitter to be searched.

18. The method of claim 1, wherein said approach comprises a selection of a search mode from a plurality of search modes.

19. The method of claim 1, and further comprising determining said approach subject to a target accuracy level associated with a position estimate to be obtained from searching said wireless signals.

20. The method of claim 1, and further comprising determining said approach subject to a power consumption constraint.

21. The method of claim 1, and further comprising determining said approach subject to a target time to position fix.

22. The method of claim 1, and further comprising determining said approach based, at least in part, on a score determined from a plurality of factors.

23. The method of claim 22, wherein said plurality of factors comprises at least one of likely power consumption, likely accuracy, likely time to fix, an observed signal strength, a size of coverage area serving the mobile device or a type of transmitter.

24. The method of claim 1, wherein said historical statistical information is associated with attempts to search signals transmitted from at least one bi-directional wireless access point.

25. The method of claim 1, wherein said historical statistical information is associated with attempts to search signals from at least one broadcast-only transmitter.

26. The method of claim 1, wherein said historical statistical information is associated with attempts to search signals from at least one broadcast-only transmitter and at least one bi-directional wireless access point.

27. The method of claim 1, wherein said historical statistical information is associated with attempts to search signals for use in at least one communication application.

28. The method of claim 27, wherein said historical statistical information is based, at least in part, upon a pilot strength measurement message (PSMM) in a 1× Code Division Multiple Access (CDMA) system.

29. The method of claim 27, wherein the historical statistical information is based, at least in part, on a network measurement response (NMR) in a Global System for Mobile Communications (GSM) system.

30. The method of claim 27, wherein the historical statistical information is based, at least in part, on a Measured Results List (MRL) of a Universal Mobile Telecommunications Service (UMTS) or Long Term Evolution (LTE) system.

31. The method of claim 1, and further comprising: receiving said historical statistical information from a plurality of sources at an aggregating entity; and updating said data representative of said one or more probabilistic models based, at least in part, on said received historical statistical information at said aggregating entity.

32. The method of claim 31, wherein said determined approach comprises a particular approach for searching for said one or more wireless signals at the mobile device, and wherein said aggregating entity is located within said mobile device.

33. The method of claim 31, wherein said determined approach comprises a particular approach for searching for said one or more wireless signals at a first mobile device, and wherein said aggregating entity is located within a second mobile device.

34. The method of claim 31, wherein said aggregating entity is located at a network entity configured to communicate with one or more mobile devices in a wireless or wired communication network.

35. The method of claim 34, said network entity is further configured to maintain information representative of estimates of transmitter positions and/or transmitter coverage areas.

36. The method of claim 1, wherein said historical statistical information is received from a plurality of sources, and wherein the method further comprises: aggregating said historical statistical information; and updating said data representative of said one or more probabilistic models based, at least in part, on said aggregated historical statistical information.

37. The method of claim 36, wherein said aggregated historical statistical information comprises transmitter timing information.

38. The method of claim 37, wherein said transmitter timing information is representative of a relationship between a framing structure of a signal transmitted by at least one transmitter and a time source.

39. The method of claim 37, wherein said transmitter timing information comprises an error estimate.

40. The method of claim 36, wherein said aggregated historical statistical information comprises an identification of one or more transmitters within a region.

41. The method of claim 40, wherein said aggregated historical statistical information identifies said one or more transmitters within said region using a hierarchical identification structure.

42. The method of claim 41, wherein said region is covered by a GSM system, and wherein said hierarchical identification structure is defined, at least in part, according to a location area code (LAC).

43. The method of claim 41, wherein said region is covered by a UMTS system, and wherein said hierarchical identification structure is defined, at least in part, according to a radio network controller (RNC).

44. The method of claim 41, wherein said region is covered by an LTE system, and wherein said hierarchical identification structure is defined, at least in part, according to a subset of a global cell identifier.

45. The method of claim 1, and further comprising searching for said one or more wireless signals using said determined approach.

46. The method of claim 1, and further comprising determining said approach based, at least in part, on observed signal strength.

47. The method of claim 1, and further comprising determining said approach based, at least in part, on a size of a coverage area.

48. The method of claim 1, and further comprising determining said approach based, at least in part, on a type of transmitter transmitting the one or more wireless signals.

49. The method of claim 1, wherein the historical statistical information includes an expected received signal strength of at least one wireless signal transmitted from a transmitter at a known location.

50. The method of claim 1, wherein the historical statistical information includes an expected round trip time of at least one wireless signal transmitted from a transmitter at a known location.

51. The method of claim 1, and wherein determining said approach further comprises determining a time for reattempting to acquire one or more signals transmitted by at least one of said one or more transmitters based, at least in part, on the updated data.

52. An article of a mobile device comprising:
a non-transitory storage medium comprising machine-readable instructions stored thereon which are executable by a processor to:
update data representative of one or more probabilistic models stored in a memory based, at least in part, on historical statistical information for wireless signals, at least a portion of said historical statistical information being determined by said mobile device;
determine one or more particular wireless signals for which to search based, at least in part, on updated data representative of said one or more probabilistic models, said one or more wireless signals to be transmitted by one or more wireless transmitters; and
search for said one or more particular wireless signals to estimate a position of said mobile device at least partially in response to determining said one or more particular wireless signals for which to search.

53. A mobile device comprising:
one or more receivers to receive and process wireless signals; and
one or more processors programmed with instructions to
update data representative of one or more probabilistic models based, at least in part, on historical statistical information for wireless signals, at least a portion of said historical statistical information being determined by said mobile device;
determine one or more particular wireless signals for which to search based, at least in part, on said updated data representative of said one or more probabilistic models, said one or more wireless signals to be transmitted by one or more wireless transmitters; and
initiate searching for said one or more particular wireless signals to estimate a position of said mobile device at least partially in response to determining said one or more particular wireless signals for which to search.

54. A mobile device comprising:
means for maintaining data representative of one or more probabilistic models in a storage medium;
means for updating said data representative of said one or more probabilistic models based, at least in part, on historical statistical information for wireless signals, at least a portion of said historical statistical information being determined by said mobile device;
means for determining one or more particular wireless signals for which to search based, at least in part, on said updated data representative of said one or more probabilistic models, said one or more wireless signals to be transmitted by one or more wireless transmitters; and
means for searching for said one or more particular wireless signals to estimate a position of said mobile device at least partially in response to determining said one or more particular wireless signals for which to search.

* * * * *